US007783850B2

(12) United States Patent
Vu et al.

(10) Patent No.: US 7,783,850 B2
(45) Date of Patent: Aug. 24, 2010

(54) METHOD AND APPARATUS FOR MASTER VOLUME ACCESS DURING VOLUME COPY

(75) Inventors: Ngoclan Thi Vu, Irvine, CA (US); James George Wayda, Laguna Niguel, CA (US); Kent Lee, Ladera Ranch, CA (US); Raghavendra Kulkarni, San Diego, CA (US)

(73) Assignee: Dot Hill Systems Corporation, Longmont, CO (US)

( * ) Notice: Subject to any disclaimer, the term of this patent is extended or adjusted under 35 U.S.C. 154(b) by 402 days.

(21) Appl. No.: 11/945,940

(22) Filed: Nov. 27, 2007

(65) Prior Publication Data

US 2008/0072003 A1    Mar. 20, 2008

Related U.S. Application Data

(63) Continuation-in-part of application No. 11/277,738, filed on Mar. 28, 2006, now Pat. No. 7,426,618.

(51) Int. Cl.
*G06F 13/00* (2006.01)
*G06F 13/28* (2006.01)
*G06F 7/00* (2006.01)
*G06F 17/00* (2006.01)

(52) U.S. Cl. .............................. 711/162; 711/E12.103; 707/639

(58) Field of Classification Search ................. 711/162, 711/E12.103; 707/204, 639
See application file for complete search history.

(56) References Cited

U.S. PATENT DOCUMENTS

| 5,551,046 | A  | 8/1996  | Mohan et al. |
|-----------|----|---------|--------------|
| 5,778,189 | A  | 7/1998  | Kimura et al. |
| 5,812,843 | A  | 9/1998  | Yamazaki et al. |
| 5,963,962 | A  | 10/1999 | Hitz et al. |
| 6,073,209 | A  | 6/2000  | Bergsten et al. |
| 6,289,356 | B1 | 9/2001  | Hitz et al. |
| 6,292,808 | B1 | 9/2001  | Obermarck et al. |
| 6,548,634 | B1 | 4/2003  | Ballinger et al. |
| 6,557,079 | B1 | 4/2003  | Mason, Jr. et al. |

(Continued)

FOREIGN PATENT DOCUMENTS

CA    2165912    6/1997

(Continued)

OTHER PUBLICATIONS

International Preliminary Report on Patentability and Written Opinion from the PCT dated Oct. 22, 2009 with regard to corresponding PCT Application No. PCT/US/08/57326, 10 pages.

(Continued)

*Primary Examiner*—Matt Kim
*Assistant Examiner*—Edward J Dudek, Jr.
(74) *Attorney, Agent, or Firm*—Thomas J. Lavan; Matthew Ryan Elisworth

(57) ABSTRACT

A method and device for performing a volume copy is provided. The volume copy method allows access to both the Volume Copy Source and Volume Copy Target while the volume copy process is occurring. This allows a system administrator to initiate a volume copy without worrying that host access to the Volume Copy Source and Volume Copy Target will be interrupted.

19 Claims, 8 Drawing Sheets

U.S. PATENT DOCUMENTS

| | | |
|---|---|---|
| 6,594,744 B1 | 7/2003 | Humlicek et al. |
| 6,615,223 B1 | 9/2003 | Shih et al. |
| 6,771,843 B1 | 8/2004 | Huber et al. |
| 6,907,512 B2 | 6/2005 | Hill et al. |
| 7,047,380 B2 * | 5/2006 | Tormasov et al. ........... 711/162 |
| 7,050,457 B2 | 5/2006 | Erfurt et al. |
| 7,100,089 B1 | 8/2006 | Phelps |
| 7,165,156 B1 | 1/2007 | Cameron et al. |
| 7,191,304 B1 | 3/2007 | Cameron et al. |
| 7,194,550 B1 | 3/2007 | Chamdani et al. |
| 7,206,961 B1 | 4/2007 | Mutalik et al. |
| 7,243,157 B2 | 7/2007 | Levin et al. |
| 7,363,444 B2 | 4/2008 | Ji et al. |
| 7,373,366 B1 | 5/2008 | Chatterjee et al. |
| 7,426,618 B2 | 9/2008 | Ngoclan et al. |
| 7,526,640 B2 | 4/2009 | Bejarano et al. |
| 2001/0039629 A1 | 11/2001 | Feague et al. |
| 2002/0091670 A1 | 7/2002 | Hitz et al. |
| 2002/0112084 A1 | 8/2002 | Deen et al. |
| 2003/0158863 A1 | 8/2003 | Haskin |
| 2003/0167380 A1 | 9/2003 | Green |
| 2003/0188223 A1 | 10/2003 | Alexis et al. |
| 2003/0191745 A1 | 10/2003 | Jiang |
| 2003/0229764 A1 | 12/2003 | Ohno et al. |
| 2004/0030727 A1 | 2/2004 | Armangau et al. |
| 2004/0030846 A1 | 2/2004 | Armengau |
| 2004/0030951 A1 | 2/2004 | Armangau |
| 2004/0054131 A1 | 3/2004 | Ballinger et al. |
| 2004/0093555 A1 | 5/2004 | Therrien et al. |
| 2004/0117567 A1 | 6/2004 | Lee et al. |
| 2004/0133718 A1 | 7/2004 | Kodama et al. |
| 2004/0172509 A1 | 9/2004 | Takeda et al. |
| 2004/0204071 A1 | 10/2004 | Bahl |
| 2004/0260673 A1 | 12/2004 | Hitz et al. |
| 2005/0004979 A1 | 1/2005 | Berkowitz et al. |
| 2005/0044088 A1 | 2/2005 | Lindsay et al. |
| 2005/0065985 A1 | 3/2005 | Tummala et al. |
| 2005/0071393 A1 | 3/2005 | Ohno et al. |
| 2005/0122791 A1 | 6/2005 | Hajeck |
| 2005/0166022 A1 | 7/2005 | Watanabe |
| 2005/0182910 A1 | 8/2005 | Stager et al. |
| 2005/0193180 A1 | 9/2005 | Fujibayashi |
| 2005/0198452 A1 | 9/2005 | Watanabe |
| 2005/0240635 A1 | 10/2005 | Kapoor |
| 2005/0246397 A1 * | 11/2005 | Edwards et al. ............. 707/204 |
| 2005/0246503 A1 | 11/2005 | Fair |
| 2006/0053139 A1 | 3/2006 | Marzinski et al. |
| 2006/0064541 A1 | 3/2006 | Kano et al. |
| 2006/0107006 A1 | 5/2006 | Green et al. |
| 2006/0155946 A1 | 7/2006 | Ji |
| 2006/0212481 A1 | 9/2006 | Stacey et al. |
| 2006/0271604 A1 | 11/2006 | Shoens |
| 2007/0038703 A1 | 2/2007 | Tendjoukian |
| 2007/0055710 A1 | 3/2007 | Malkin et al. |
| 2007/0100808 A1 | 5/2007 | Balogh |
| 2007/0185973 A1 | 8/2007 | Wayda et al. |
| 2007/0186001 A1 | 8/2007 | Wayda et al. |
| 2007/0266066 A1 | 11/2007 | Kapoor et al. |
| 2007/0276885 A1 | 11/2007 | Valiyaparambil |
| 2008/0114951 A1 | 5/2008 | Lee |
| 2008/0177954 A1 | 7/2008 | Lee |
| 2008/0177957 A1 | 7/2008 | Lee |
| 2008/0256141 A1 | 10/2008 | Wayda et al. |
| 2008/0256311 A1 | 10/2008 | Lee |
| 2008/0281875 A1 | 11/2008 | Wayda et al. |
| 2008/0281877 A1 | 11/2008 | Wayda et al. |
| 2008/0320258 A1 | 12/2008 | Wayda et al. |

FOREIGN PATENT DOCUMENTS

| | | |
|---|---|---|
| EP | 1003103 | 5/2000 |
| WO | WO9429807 | 12/1994 |
| WO | WO 02050716 | 6/2002 |
| WO | WO2005111773 | 11/2005 |
| WO | WO2005111802 | 11/2005 |

OTHER PUBLICATIONS

Examiner Nguyen, Tanh Q., Office Action in U.S. Appl. No. 11/561,512, Dec. 10, 2009.
Official Action for U.S. Appl. No. 11/747,109, mailed Dec. 14, 2009.
Official Action for U.S. Appl. No. 11/747,127, mailed Jan. 6, 2010.
Official Action for U.S. Appl. No. 11/624,565, mailed Nov. 30, 2009.
International Preliminary Report on Patentability and Written Opinion from the PCT dated Mar. 20, 2008 with regard to corresponding PCT Application No. PCT/US/06/032506, 10 pages.
Official Action for U.S. Appl. No. 11/561,512, mailed Jun. 25, 2009.
Office Action in U.S. Appl. No. 11/561,512, Apr. 3, 2009, 11 pages.
Notice of Allowance for U.S. Appl. No. 11/560,174, mailed Feb. 9, 2009.
Official Action for U.S. Appl. No. 11/560,174, mailed Sep. 5, 2008.
Official Action for U.S. Appl. No. 11/624,524, mailed Dec. 11, 2008.
Official Action for U.S. Appl. No. 11/624,524, mailed Jun. 16, 2009.
Official Action for U.S. Appl. No. 11/624,565, mailed Mar. 30, 2009.
Official Action for U.S. Appl. No. 11/747,109, mailed Mar. 9, 2009.
Official Action for U.S. Appl. No. 11/734,081, mailed May 8, 2009.
Analysis from foreign associate dated Oct. 22, 2009 from 1st office action from Chinese patent office for application 200680032724.8 (Dot Hill systems reference No. DHP0056 CN).
Office Action in U.S. Appl. No. 11/561,512, Oct. 30, 2009, 9 pages.
Official Action for U.S. Appl. No. 11/747,109, mailed Sep. 21, 2009.
Official Action for U.S. Appl. No. 11/747,127, mailed Oct. 6, 2009.
Official Action for U.S. Appl. No. 11/624,524, mailed Sep. 16, 2009.
Official Action for U.S. Appl. No. 11/734,081, mailed Aug. 21, 2009.
Official Action for U.S. Appl. No. 11/747,127, mailed Apr. 15, 2009.
International Search Report from the PCT dated Aug. 7, 2008 with regard to corresponding PCT Application No. PCT/US/08/57326, 2 pages.
Written Opinion from the PCT dated Aug. 7, 2008 with regard to corresponding PCT Application No. PCT/US/08/57326, 6 pages.
Office Action in Application in U.S. Appl. No. 11/277,738, Apr. 3, 2007, 14 pages.
Office Action in Application in U.S. Appl. No. 11/277,738, Jul. 31, 2007, 8 pages.
Written Opinion from the PCT dated Mar. 27, 2007 with regard to corresponding PCT Application No. PCT/US/06/32506, 10 pages.
International Search Report from the PCT dated Mar. 27, 2007 with regard to corresponding PCT Application No. PCT/US/06/32506, 3 pages.
Office Action in U.S. Appl. No. 11/779,965, Jan. 29, 2010.
Office Action in U.S. Appl. No. 11/561,512, Mar. 18, 2010.
Official Action for U.S. Appl. No. 11/747,109, mailed Mar. 30, 2010.
Official Action for U.S. Appl. No. 11/624,524, mailed Jan. 26, 2010.
Notice of Allowance for U.S. Appl. No. 11/734,081, mailed Feb. 2, 2010.
Notice of Allowance for U.S. Appl. No. 11/734,081, mailed Mar. 10, 2010.
Notice of Allowance for U.S. Appl. No. 11/747,127, mailed May 14, 2010.
Notice of Allowance for U.S. Appl. No. 11/747,127, mailed Jun. 2, 2010.
Notice of Allowance for U.S. Appl. No. 11/747,127, mailed Jun. 15, 2010.
Official Action for U.S. Appl. No. 11/768,127, mailed Apr. 2, 2010.
Official Action for U.S. Appl. No. 11/768,127, mailed Jun. 1, 2010.

* cited by examiner

METHOD AND APPARATUS FOR MASTER VOLUME ACCESS DURING VOLUME COPY

CROSS REFERENCE TO RELATED APPLICATIONS

This application is a continuation-in-part of application Ser. No. 11/277,738, filed Mar. 28, 2006, entitled "Snapshot Restore Method and Apparatus," the entire disclosure of which is hereby incorporated herein by reference.

FIELD OF THE INVENTION

The present invention is directed to data storage management. In particular, the present invention is directed to methods and apparatuses for managing snapshot data.

BACKGROUND

The need to store digital files, documents, pictures, images and other data continues to increase rapidly. In connection with the electronic storage of data, various data storage systems have been devised for the rapid and secure storage of large amounts of data. Such systems may include one or a plurality of storage devices that are used in a coordinated fashion. Systems in which data can be distributed across multiple storage devices such that data will not be irretrievably lost if one of the storage devices (or in some cases, more than one storage device) fails are also available. Systems that coordinate operation of a number of individual storage devices can also provide improved data access and/or storage times. Examples of systems that can provide such advantages can be found in the various RAID (redundant array of independent disks) levels that have been developed. Whether implemented using one or a plurality of storage devices, the storage provided by a data storage system can be treated as one or more storage volumes.

In order to facilitate the availability of desired data, it is often advantageous to maintain different versions of a data storage volume. Indeed, data storage systems are available that can provide at least limited data archiving through backup facilities and/or snapshot facilities. The use of snapshot facilities greatly reduces the amount of storage space required for archiving large amounts of data.

Snapshots provide a versatile feature that is useful for data recovery operations, such as backup and recovery of storage elements. However, read/write access to snapshots, especially sparse snapshots, is traditionally much slower than read/write access to an actual storage volume, such as a master volume. The difference in read/write access speeds occurs because a controller may have to search for snapshot data from a particular point-in-time from a number of different snapshots or the master volume. On the other hand, the controller can pull all of the information from a single storage volume without searching through a number of different locations (e.g., snapshots or a master volume). Accordingly, system administrators sometimes desire to copy a snapshot to an actual storage volume such that the point-in-time representation of the snapshot can be more easily accessed by host systems.

One problem introduced by traditional volume copy procedures is that host systems are not allowed to access either the snapshot or the storage volume being created until after the volume copy procedure is complete. In large data storage systems the amount of time required to complete a volume copy procedure may be on the order of hours to days. Thus, most volume copy procedures have to be scheduled during non-working hours because access to the snapshot data and storage volume will be restricted. This presents an inconvenience to the system administrator as well as any person that attempts to access the storage volume or snapshot data during the volume copy.

Another problem with current volume copy procedures is that the attributes of the storage volume being created are different from the snapshot from which it is being copied. More specifically, the World Wide Name (WWN) and other attributes used to access data will differ between the snapshot and the newly created storage volume. Accordingly, system administrators are required to reconfigure any host-based applications, such as automated data backup applications, that previously referenced the snapshot to now reference the newly created storage volume. If the reconfiguration of the application is not done properly, then that application will not function properly and data may be lost or corrupted.

Still another problem with current volume copy procedures is that there is currently no way to volume copy from a master volume because the master volume is always changing due to host read/write accesses. Rather, volume copy procedures are only provided for creating a storage volume copy of a snapshot.

It would therefore be desirable to provide a volume copy procedure that allows access to both the snapshot being copied (i.e., the Volume Copy Source) as well as the storage volume being created (i.e., the Volume Copy Target) during the volume copy procedure. It would further be desirable to provide a volume copy procedure that does not require a system administrator to reconfigure all host applications that previously referenced the snapshot to reference the newly created storage volume. It would also be desirable to allow a volume copy of a master volume as opposed to only snapshots.

SUMMARY

The present invention is directed to solving these and other problems and disadvantages of the prior art. In accordance with embodiments of the present invention, a volume copy method (i.e., rolloff procedure) is provided. The method generally comprises receiving a command to create a volume copy of a volume copy source, creating a volume copy target, and copying data from a snapshot associated with the volume copy source to the volume copy target. One inventive aspect of the present invention is that host access to the volume copy source and/or volume copy target while the copying data step is occurring. Accordingly, a volume copy may be initiated at any time without concern for restricting host access to either the volume copy source and/or volume copy target.

In accordance with embodiments of the present invention, a device for controlling a data storage system is provided. The device generally comprises a snapshot application comprising a volume copy module operable to copy data from a snapshot associated with a volume copy source to a volume copy target. The device also comprises an Input/Output (I/O) application operable to execute read and write commands from at least one of the volume copy source and volume copy target while the volume copy module is copying data from the snapshot to the volume copy source.

Additional features and advantages of embodiments of the present invention will become more readily apparent from the following description, particularly when taken together with the accompanying drawings.

DETAILED DESCRIPTION

In accordance with embodiments of the present invention, a snapshot is a block level point-in-time representation of data on a storage volume. The data is essentially frozen in time at the instant that the snapshot is taken. Although data on the storage volume may change as a result of write operations, the data within the snapshot will remain constant and frozen in time at the instant that the snapshot was taken. In order to preserve snapshot data, a backing store, also known as a snap-pool, is used to store data that is not otherwise represented in the storage volume and snapshot metadata. All data and metadata associated with the snapshot is stored in the backing store. In accordance with embodiments of the present invention, data is stored within the snapshot in "chunks" or "data block ranges." A chunk or data block is equivalent to a number of Logical Block Addresses (LBAs). Alternatively or in addition, data can be stored within subchunks. A subchunk is a fixed size subset of a chunk or data block. Pointers, table entries, or other data structures can be used to identify the location of a chunk in the backing store.

Figure 1:
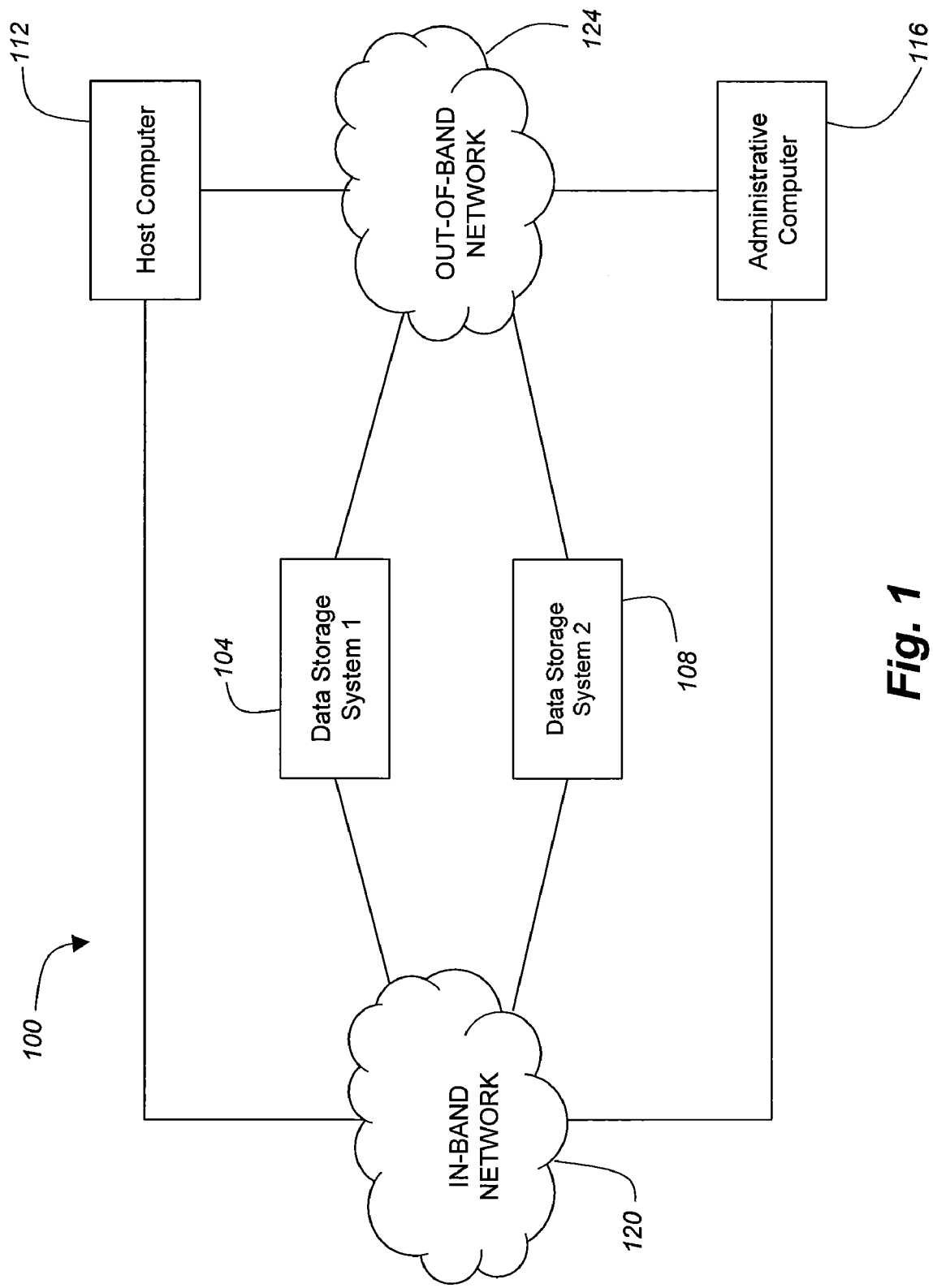
FIG. 1 is a functional block diagram depicting components of an electronic data system incorporating one or more data storage systems in accordance with embodiments of the present invention.

FIG. 1 is a block diagram depicting an electronic data system 100 in accordance with embodiments of the present invention incorporating a first data storage system 104 and a second data storage system 108. The electronic data system 100 may also include one or more host processors, computers or computer systems 112. In addition, the electronic data system 100 may include or may be interconnected to an administrative computer 116. As will be appreciated by one of skill in the art after consideration of the present disclosure, embodiments of the present invention have application in association with single or multiple hosts 112 in storage area network (SAN) or direct connect environments.

The data storage systems 104, 108 are typically interconnected to one another through an in-band network 120. The in-band network 120 may also interconnect the data storage systems 104, 108 to a host computer 112 and/or an administrative computer 116. The electronic data system 100 may also include an out-of-band network 124 interconnecting some or all of the electronic data system 100 nodes 104, 108, 112 and/or 116. For example, one or more host computers 112 are connected to each data storage system 104, 108. For instance, a first data storage system 104 is connected to a second data storage system 108 across some distance by a Fibre Channel or a TCP/IP network 120, and each of these data storage systems 104, 108 is connected to a host computer 112 through an in-band 120 and/or an out-of-band 124 network.

The in-band or storage area network 120 generally functions to transport data between data storage systems 104 and/or 108 and host devices 112, and can be any data pipe capable of supporting multiple initiators and targets. Accordingly, examples of in-band networks 120 include Fibre Channel (FC), iSCSI, parallel SCSI, Ethernet, ESCON, or FICON connections or networks, which may typically be characterized by an ability to transfer relatively large amounts of data at medium to high bandwidths. The out-of-band network 124 generally functions to support the transfer of communications and/or commands between various network nodes, such as data storage resource systems 104, 108, host computer 112, and/or administrative computers 116, although such data may also be transferred over the in-band communication network 120. Examples of an out-of-band communication network 124 include a local area network (LAN) or other transmission control protocol/Internet protocol (TCP/IP) network. In general, the out-of-band communication network 124 is characterized by an ability to interconnect disparate nodes or other devices through uniform user interfaces, such as a web browser. Furthermore, the out-of-band communication network 124 may provide the potential for globally or other widely distributed management of data storage systems 104, 108 via TCP/IP.

Every electronic data system node or computer 104, 108, 112 and 116, need not be interconnected to every other node or device through both the in-band network 120 and the out-of-band network 124. For example, no host computer 112 needs to be interconnected to any other host computer 112, data storage system 104, 108, or administrative computer 116 through the out-of-band communication network 124, although interconnections between a host computer 112 and other devices 104, 108, 116 through the out-of-band communication network 124 are not prohibited. As another example, an administrative computer 116 may be interconnected to at least one storage system 104 or 108 through the out-of-band communication network 124. An administrative computer 116 may also be interconnected to the in-band network 120 directly, although such an interconnection is not required. For example, instead of a direct connection, an administrator computer 116 may communicate with a controller of a data storage system 104, 108 using the in-band network 120.

In general, a host computer 112 exchanges data with one or more of the data storage systems 104, 108 in connection with the performance of the execution of application programming, whether that application programming concerns data management or otherwise. Furthermore, an electronic data system 100 may include multiple host computers 112. An administrative computer 116 may provide a user interface for controlling aspects of the operation of the storage systems 104, 108. The administrative computer 116 may be interconnected to the storage system 104, 108 directly, and/or through a bus or network 120 and/or 124. In accordance with still other embodiments of the present invention, an administrative computer 116 may be integrated with a host computer 112. In addition, multiple administrative computers 116 may be provided as part of the electronic data system 100. Furthermore, although two data storage systems 104, 108 are shown in FIG. 1, an electronic data system 100 may include more than two data storage systems or may include a single data storage system.

Figure 2:
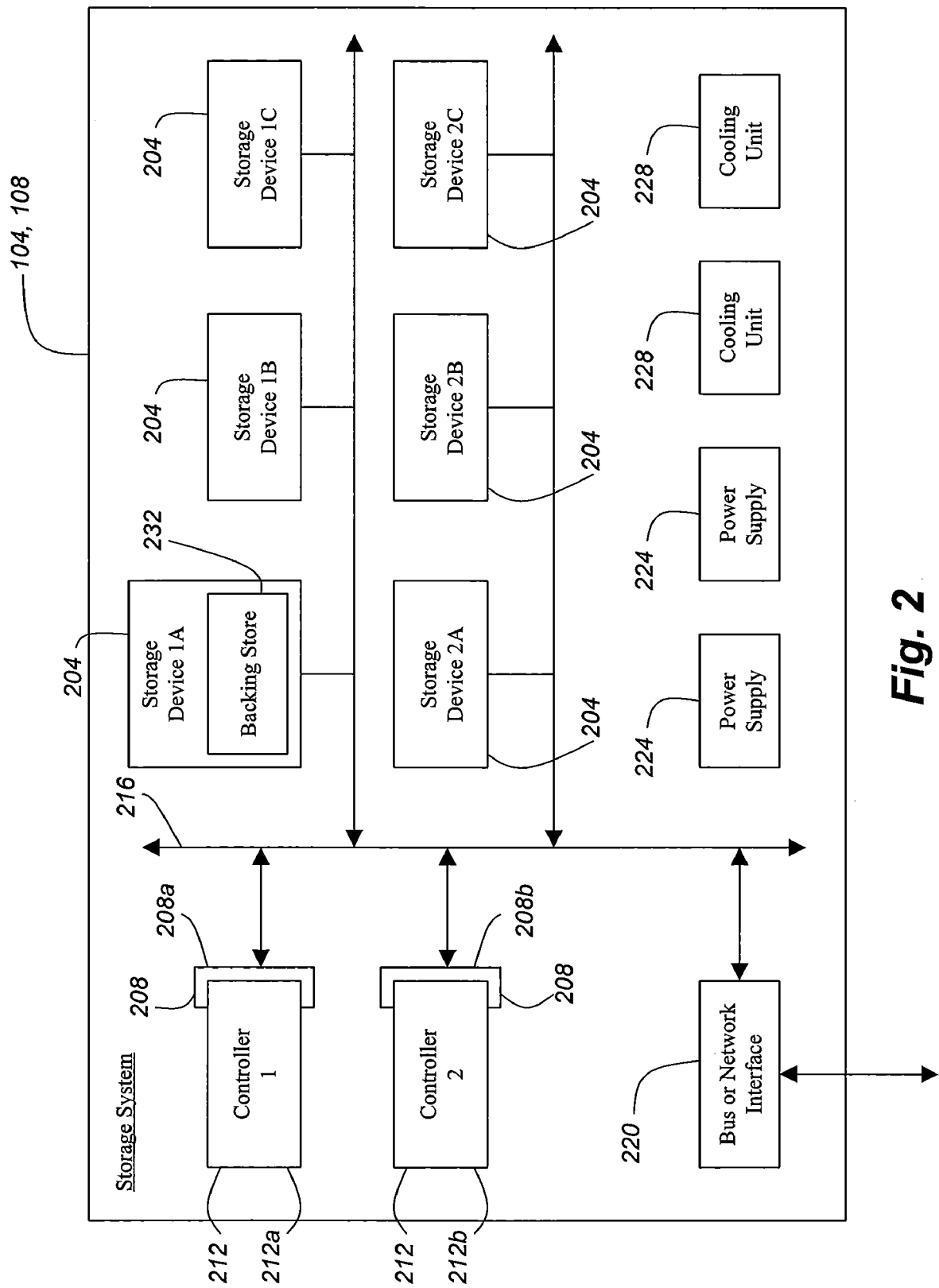
FIG. 2 is a block diagram depicting components of a data storage system in accordance with embodiments of the present invention.

FIG. 2 illustrates components that may be included in a data storage system 104, 108 in accordance with embodiments of the present invention. In general, the data storage system 104, 108 includes a number of storage devices 204. Examples of storage devices 204 include hard disk drives, such as serial advanced technology attachment (SATA), small computer system interface (SCSI), serial attached SCSI (SAS), Fibre Channel (FC), or parallel advanced technology attached (PATA) hard disk drives. Other examples of storage devices 204 include magnetic tape storage devices, optical storage devices or solid state disk devices. Furthermore, although a number of storage devices 204 are illustrated, it should be appreciated that embodiments of the present invention are not limited to any particular number of storage devices 204, and that a lesser or greater number of storage devices 204 may be provided as part of a data storage system 104. As can be appreciated by one of skill in the art, one or more arrays and/or array partitions, hereinafter referred to as logical unit numbers (LUNs) comprising a storage volume, may be established on the data storage devices 204. As can be further appreciated by one of skill in the art, a LUN may be implemented in accordance with any one of the various array levels or other arrangements for storing data on one or more storage devices 104. As can also be appreciated by one of skill in the art, the storage devices 204 may contain data comprising a master storage volume, which may correspond to a LUN, in addition to one or more snapshots of the master storage volume taken at different times. As can further be appreciated by one of skill in the art, snapshots may comprise metadata and data stored in a backing store on the storage devices 204. As can also be appreciated by one of skill in the art, the storage devices 204 contain data comprising a master storage volume, which may correspond to a LUN, and one or more snapshots of the storage volume taken at different times. In one embodiment, the snapshots may be mapped to the LUNs and stored on a backing store 232. However, the backing store 232, which also occupies an array and/or array partition, does not have a LUN number assigned to it, thus making the backing store 232 invisible to a host computer 112 and/or administrative computer 116. The backing store 232 may also be used to store all data and metadata for a particular snap-pool (i.e., collection of snapshots).

A data storage system 104, 108, in accordance with embodiments of the present invention, may be provided with a first controller slot 208a. In addition, other embodiments may include additional controller slots, such as a second controller slot 208b. As can be appreciated by one of skill in the art, a controller slot 208 may comprise a connection or set of connections to enable a controller 212 to be operably interconnected to other components of the data storage system 104, 108. Furthermore, a data storage system 104, 108 in accordance with embodiments of the present invention includes at least one controller 212a. For example, while the data storage system 104, 108 is operated in a single controller, non-failover mode, the data storage system 104, 108 may include exactly one controller 212. A data storage system 104, 108 in accordance with other embodiments of the present invention may be operated in a dual redundant active-active controller mode by providing a second controller 212b. When a second controller 212b is used in addition to a first controller 212a, the second controller slot 208b receives the second controller. As can be appreciated by one of skill in the art, the provision of two controllers, 212a and 212b, permits data to be mirrored between the controllers 212a-212b, providing redundant active-active controller operation.

One or more busses or channels 216 are generally provided to interconnect a controller or controllers 212 through the associated controller slot or slots 208 to the storage devices 204. Furthermore, while illustrated as a single shared bus or channel 216, it can be appreciated that a number of dedicated and/or shared buses or channels may be provided. Additional components that may be included in a data storage system 104 include one or more power supplies 224 and one or more cooling units 228. In addition, a bus or network interface 220 may be provided to interconnect the data storage system 104, 108 to the bus or network 112, and/or to a host computer 108 or administrative computer 116.

Although illustrated as a complete RAID system in FIG. 2, it should be appreciated that the data storage system 104, 108 can comprise one or more storage volumes implemented in various other ways. For example, the data storage system 104, 108 may comprise a hard disk drive or other storage device 204 connected or associated with a server or a general-purpose computer. As further examples, the storage system 104 may comprise a Just a Bunch of Disks (JBOD) system or a Switched Bunch of Disks (SBOD) system.

Figure 3:
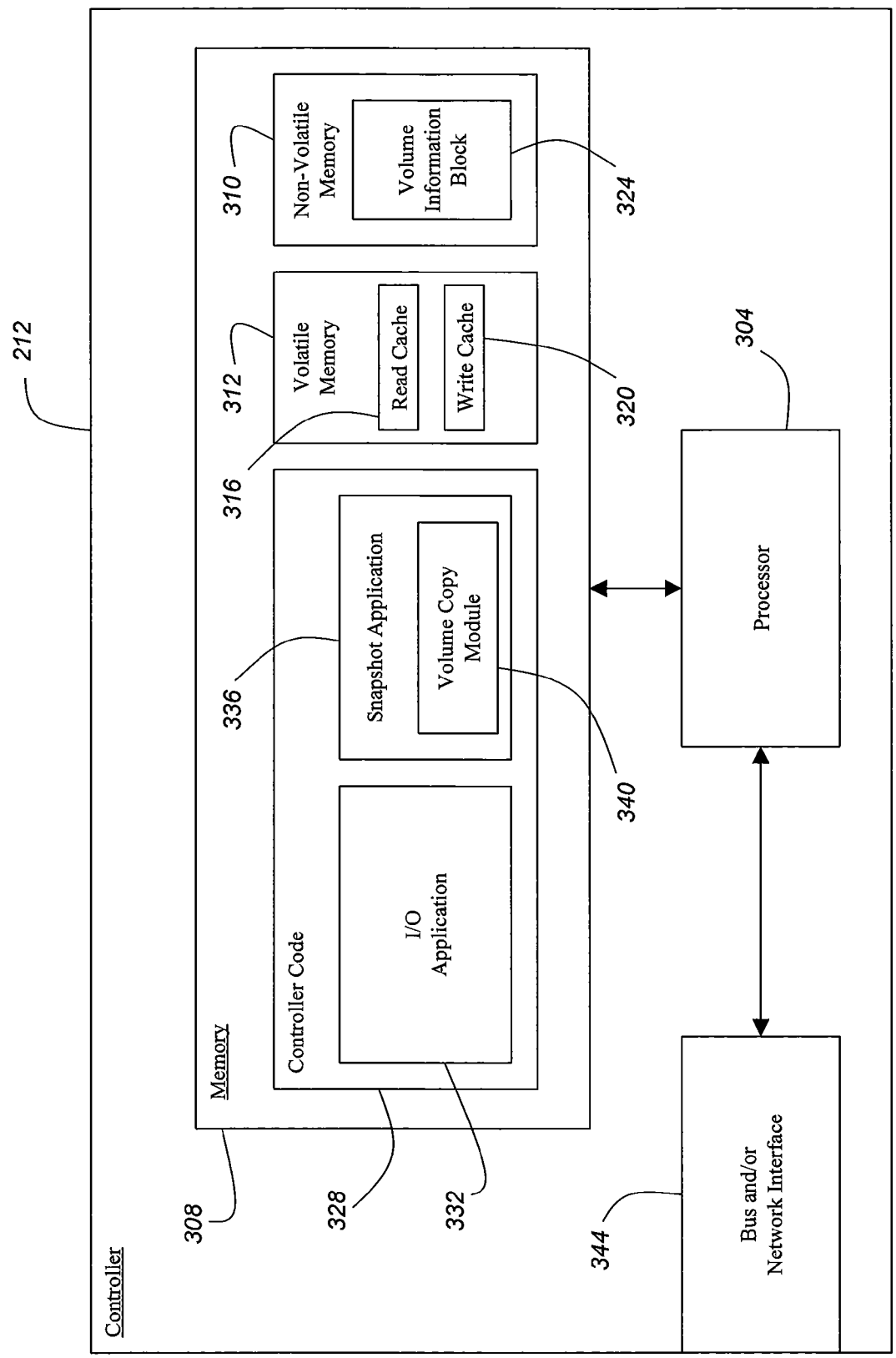
FIG. 3 is a block diagram depicting components of a storage controller in accordance with embodiments of the present invention.

FIG. 3 illustrates aspects of a storage controller 212 in accordance with embodiments of the present invention. In general, a storage controller 212 includes a processor subsystem 304 capable of executing instructions for performing, implementing and or controlling various controller 212 functions. Such instructions may include instructions for implementing aspects of a snapshot management method and apparatus as well as a volume copy method and apparatus. Furthermore, such instructions may be stored as software and/or firmware. As can be appreciated by one of skill in the art, operations concerning the generation of parity data or other operations may be performed using one or more hardwired and/or programmable logic circuits provided as part of the processor subsystem 304. Accordingly, the processor subsystem 304 may be implemented as a number of discrete components, such as one or more programmable processors in combination with one or more logic circuits. Processor subsystem 304 may also include or be implemented as one or more integrated devices or processors. For example a processor subsystem may comprise a complex programmable logic device (CPLD).

A controller 212 also generally includes memory 308. The memory 308 is not specifically limited to memory of any particular type. For example, the memory 308 may comprise a solid-state memory device, or a number of solid-state memory devices. In addition, the memory 308 may include separate non-volatile memory 310 and volatile memory 312 portions. As can be appreciated by one of skill in the art, the memory 308 may include a read cache 316 and a write cache 320 that are provided as part of the volatile memory 312 portion of the memory 308, although other arrangements are possible. By providing caches 316, 320, a storage controller 212 can improve the speed of input/output (I/O) operations between a host 112 and the data storage devices 204 comprising an array or array partition. More particularly, the caches 316, 320 can be used to improve I/O commands issued and/or executed during a volume copy procedure. Examples of volatile memory 312 include DRAM and SDRAM.

The non-volatile memory 310 may be used to store data that was written to the write cache of memory 308 in the event of a power outage affecting the data storage system 104. The non-volatile memory portion 310 of the storage controller memory 308 may include any type of data memory device that is capable of retaining data without requiring power from an external source. Examples of non-volatile memory 310 include, but are not limited to, compact flash or other standardized non-volatile memory devices.

A volume information block 324 may be stored in the non-volatile memory 310, although in accordance with at least some embodiments of the present invention, the volume information block 324 resides in volatile memory 312. The volume information block 324 comprises data that may be used to represent attribute and state information for master volumes, backing stores 232, and/or snapshots. Each master volume, backing store 232, and snapshot is typically associated with a different volume information block 324. The volume information block 324 is generally employed by the processor 304 to determine whether certain data is located on master volumes, backing stores 232, and/or snapshots and whether such data is safe to access based on the state of each. For example, the state of a master volume or backing store may be such that if data access were attempted, data corruption may occur. Accordingly, the volume information block 324 may be referenced prior to data access during an I/O operation.

The memory 308 also includes portions of the memory 308 comprising a region that provides storage for controller code 328. The controller code 328 may comprise a number of components, including an I/O application 332 comprising instructions for accessing and manipulating data. The I/O application 332 may provide the controller 212 with the ability to perform read and/or write operations of data on a storage volume and/or on a snapshot during a volume copy procedure. The I/O application 332 may reference the volume information block 324 prior to executing such operations. The I/O application 332 may further reference metadata in the backing store 232 prior to executing I/O operations. The I/O application 332 may also employ the read and write caches 316 and 320 respectively when performing such operations.

A snapshot application 336 is an example of another application that may be included in the controller code 328. The snapshot application 336 may be adapted to create and manage various snapshots in one or more backing stores 232. In accordance with at least one embodiment of the present invention, the snapshot application 336 is characterized by the ability to employ a volume copy module 340 that is adapted to create a volume copy of either a master volume or a snapshot.

A storage controller 212 may additionally include other components. For example, a bus and/or network interface 344 may be provided for operably interconnecting the storage controller 212 to the remainder of the data storage system 104, for example through a controller slot 208 and a bus or channel 216. Furthermore, the interface 344 may be configured to facilitate removal or replacement of the storage controller 212 in a controller slot 208 as a field replaceable unit (FRU). In addition, integral signal and power channels may be provided for interconnecting the various components of the storage controller 212 to one another.

Figure 4:
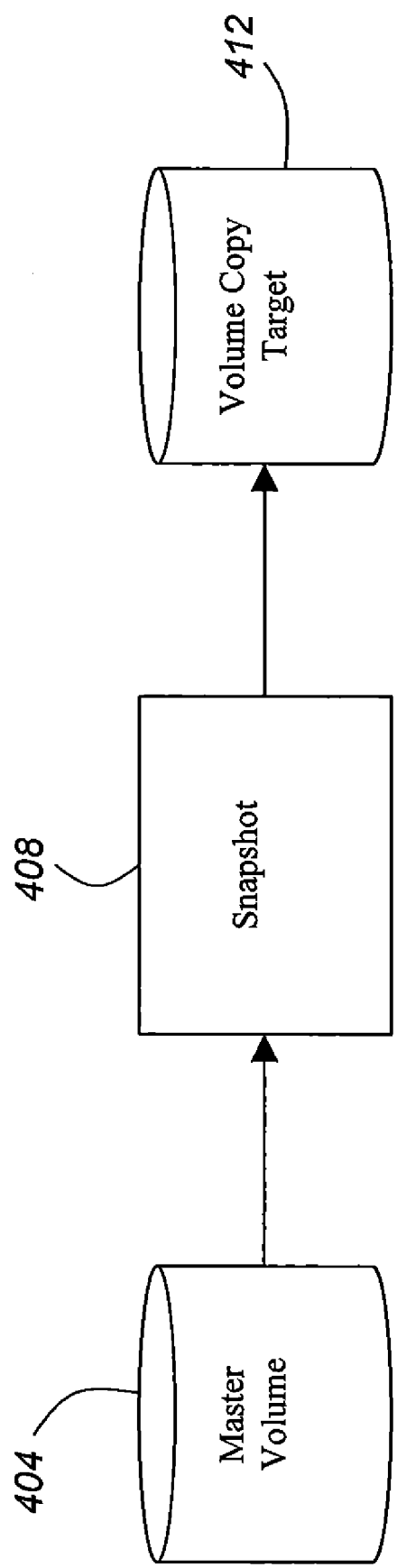
FIG. 4 is a diagram depicting a master volume, snapshot, and volume copy target in accordance with embodiments of the present invention.

FIG. 4 depicts a master volume 404, a snapshot 408 of the master volume 404, and a volume copy target 412. The snapshot 408 comprises a point-in-time representation of data stored on the master volume 404. Although only a single snapshot 408 is depicted, one skilled in the art will appreciate that a plurality of snapshots 408 may be created to preserve the master volume 404 data at different points-in-time. Each snapshot 408 of the master volume 404 may be maintained in a snap-pool or similar type collection of snapshot 408. In accordance with at least one embodiment of the present invention, the snapshot 408 comprises a sparse snapshot. This means that data is only written from the master volume 404 to the most recently created snapshot 408 in response to the master volume 404 being written to thereby changing some of its data from its state at the point-in-time represented by the most recently created snapshot 408 to a new state. Upon determining that a change is going to occur in the master volume 404, the snapshot application 336 will issue a Copy On Write (COW) command that transfers the data that is going to be changed on the master volume 404 to a corresponding location on the snapshot 408 prior to completing the write command to the master volume 404. Accordingly, the point-in-time representation of the snapshot 408 is maintained.

One aspect of spare snapshots systems is that data representing a particular point-in-time of the master volume 404 may be maintained on one or more snapshots 408, depending upon when the master volume 404 was changed in relation to when the snapshot 408 was created. For example, a snapshot 408 will receive all point-in-time data for the master volume 404 until a newer snapshot 408 is created at which point all point-in-time data for the master volume 404 will be written to the newer snapshot 408 via a COW. The snapshot 408 depicted in FIG. 4 represent either the first made snapshot 408 or a newer snapshot 408. Additionally, the snapshot 408 may be a temporary snapshot 408 created in response to the controller 212 receiving a request to make a volume copy of the master volume 404. In the event that the snapshot 408 is a temporary snapshot, then COWs will be issued to the temporary snapshot 408. However, when it is time to delete the temporary snapshot 408, all data from the temporary snapshot 408 will be transferred to a previously created snapshot 408 as needed, assuming such a snapshot exists.

The volume copy target 412, on the other hand, is a complete volume copy of either the snapshot 408 or the master volume 404. In this regard, all of the data for the volume copy target 412 is maintained completely within the volume copy target 412 as opposed to being spread out across a snap-pool and/or master volume 404. This affords quicker I/O operations to be performed by the I/O application 332 on the volume copy target 412 as compared to the snapshot 408. The volume copy target 412 may occupy a partition on an array and could be associated with an array that contains the backing store partition.

Figure 5:
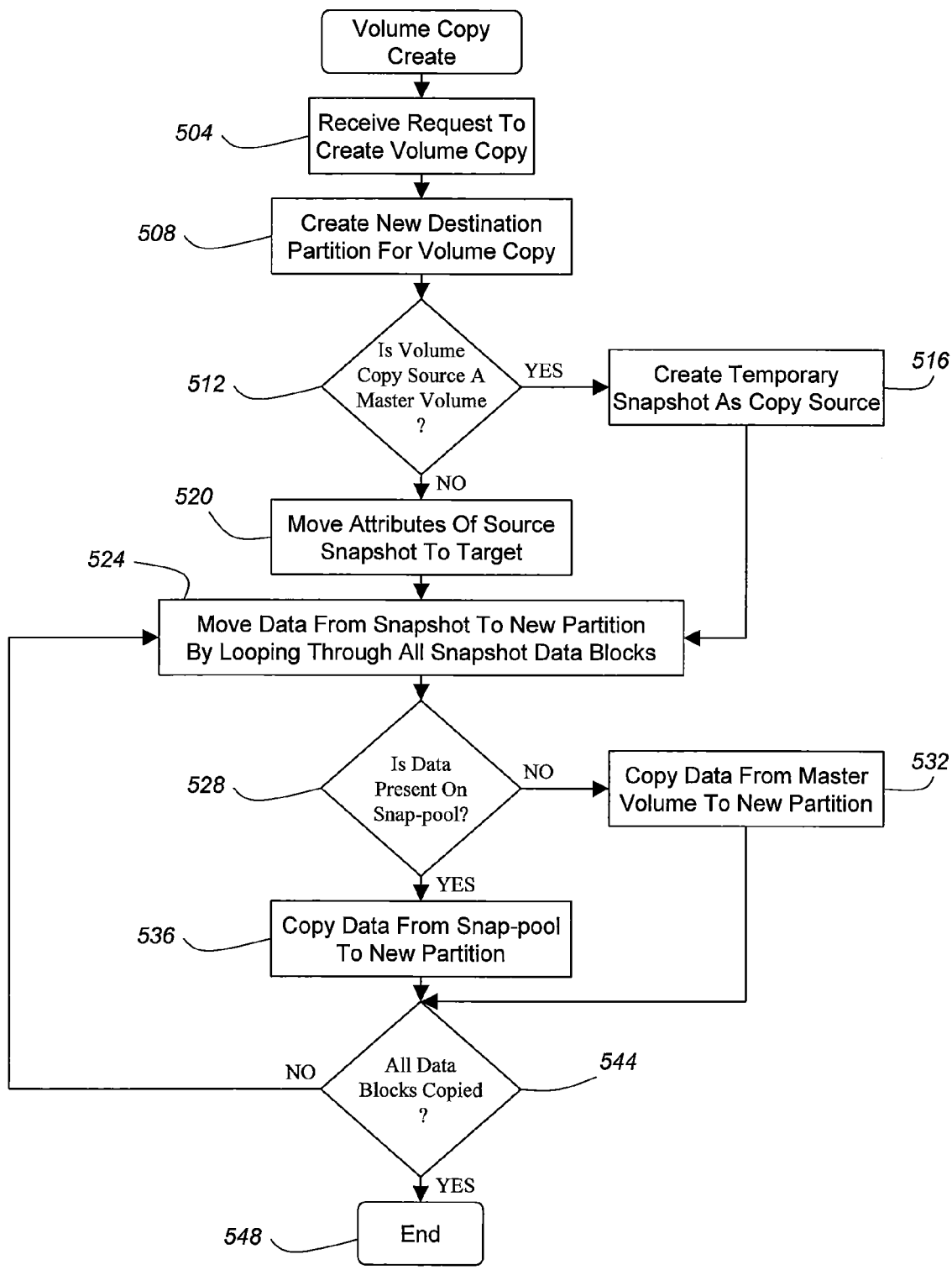
FIG. 5 is a flow diagram depicting a volume copy create method in accordance with embodiments of the present invention.

FIG. 5 depicts a volume copy method in accordance with at least some embodiments of the present invention. The method is initiated when a request to create a volume copy is received at the controller 212 (step 504). The request may be initiated by either the host 112 or administrative computer 116. The request may also be issued automatically based on predetermined thresholds that define when a new volume copy of a snapshot 408 or master volume 404 should be created. Such thresholds may be described by parameters that may include the speed of execution of I/O operations from the snapshot 408 as well as the number of I/O requests received within a particular time period. If one or both of these parameters are met then the threshold may be exceeded and an automatic request for a volume copy may issue.

In response to receiving a request to create a volume copy, the controller 212 employs the volume copy module 340 via the snapshot application 336 to create a new destination partition for the volume copy target 412 on an array specified by a user (step 508). As noted above, a partition refers to a logical disk. In accordance with at least some embodiments of the present invention, the newly created partition has a LUN number assigned to it, thereby making it immediately host addressable.

After the destination partition has been created, the method continues by determining if the volume copy source is a master volume 404 (step 512). In other words, the controller 212 references the copy source identified by the request to determine if it corresponds to a master volume 404 or a snapshot 408. In the event that the volume copy source corresponds to a master volume 404, then the controller 212 employs the snapshot application 336 to create a temporary snapshot 408 to act as a pseudo volume copy source (step 516). The temporary snapshot 408 may receive COW data resulting from changes in the master volume 404. However, the temporary snapshot 408 will not retain such data. Instead, after the volume copy procedure has completed, the data from the temporary snapshot 408 will be transferred to a previously created snapshot 408 as needed, since in some cases the data does not need to be transferred and can instead be deleted. Throughout the duration of the volume copy procedure the temporary snapshot 408 will serve as the volume copy source since using the master volume 404 as an actual volume copy source would possibly result in data corruption (e.g., due to the changing nature of the master volume 404).

Referring back to step 512, in the event that the identified volume copy source is not a master volume 404, the method continues by moving the attributes of the source snapshot 408 to the volume copy target (step 520). In this step, the attributes (e.g., WWN, LUN, and serial number) of the source snapshot 408 are transferred to the volume copy target from the volume copy source. Also in this step, new attributes are assigned to the volume copy source snapshot 408 such that it can be referenced and accessed by the controller 212. By transferring the attributes from the volume copy source to the volume copy target 412, a host 112 will begin accessing the volume copy target 412 instead of the snapshot 408 represented by the volume copy source without having to change any addressing information locally. This means the transition from referencing the snapshot 408 to the volume copy target 412 is seamless and transparent to the host 112 with the added benefit of quicker I/O commands since the referenced partition belongs to a storage volume rather than a snapshot 408.

After the attributes of the source snapshot 408 have been transferred to the volume copy target 412, or in the event that the identified volume copy source corresponded to a master volume 404, the volume copy module 340 continues by moving data from the snapshot (e.g., either a temporary snapshot 408 or actual snapshot 408) to the new partition by looping through all snapshot 408 data blocks (step 524). Incrementing through each data block of the snapshot 408 represents one of many ways that the present invention can be practiced. As another example, the volume copy module 340 may increment through the snapshot 408 at a sub-chunk level. The amount of granularity used for incrementing through the snapshot 408 may be adjusted based on user preferences and system requirements.

As the volume copy module 340 increments through the data blocks of the snapshot 408, the volume copy module 340 determines whether the data for each data block is present on the snap-pool (step 528). In other words, the volume copy module 340 determines whether the data is on the snapshot 408 being copied or any subsequent snapshot taken of the master volume 404. The volume copy module 340 may make this determination by referencing metadata on the backing store partition. If the data is not present on the snap-pool, then the data is still on the master volume 404. Accordingly, the volume copy module 340 will copy the data from the master volume 404 to the new partition (step 532).

However, if the data is residing somewhere in the snap-pool, then the volume copy module 340 copies the data from the snap-pool to the new partition (step 536). Whether the volume copy module 340 copies the snapshot data from the snap-pool or the master volume 404, the volume copy module 340 is still generally considered to be copying the data from the snapshot 408 to the volume copy target 412, because the data being copied corresponds to the point-in-time representation of the snapshot 408. The only difference in these situations is the actual source of the snapshot data.

It should be noted that host access to the volume copy source and volume copy target may be allowed during the entire volume copy process. To prevent host I/Os and volume copy I/Os from corrupting data, a locking mechanism may be employed to prevent both I/Os from accessing the same block range at the same time.

The volume copy module 340 continues by determining whether all of the snapshot data has been copied to the volume copy target 412 (step 544). In other words, the volume copy module 340 determines if it has incremented through all of the data blocks of the snapshot 408. This determination may be made by referencing a watermark that is used to track and indicate the progress of the volume copy procedure. The watermark may be a marker stored either on the backing store 232 or in the controller memory 308 that indicates the last data block of the snapshot 408 that has been copied to the volume copy target 412. If all of the snapshot data blocks are below the watermark, thereby indicating that all data blocks have been copied, then the method ends (step 548). On the other hand, if one data block is still above the watermark, thereby indicating that at least that data block has not been copied to the volume copy target 412, then the method returns to step 524.

Figure 6:
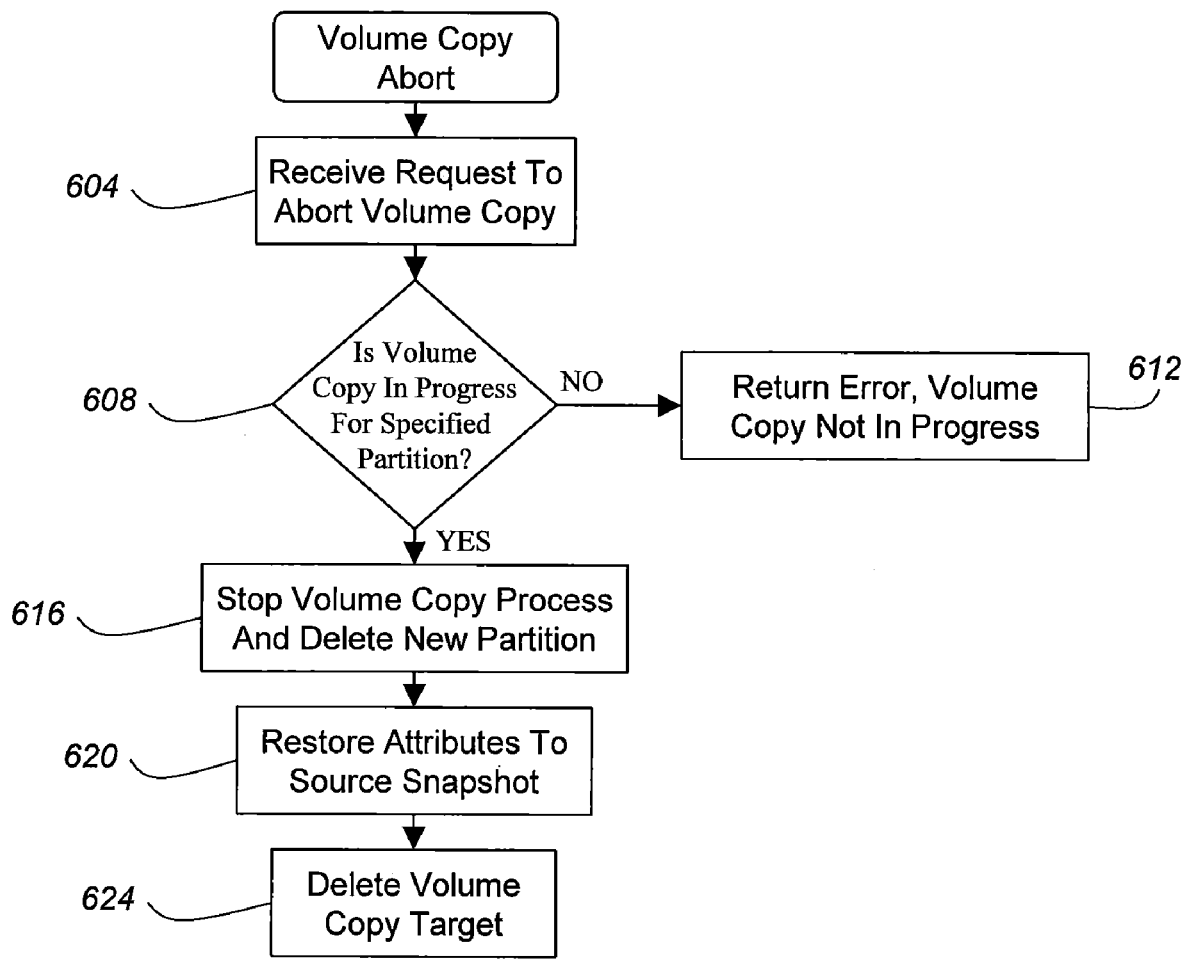
FIG. 6 is a flow diagram depicting a volume copy abort method in accordance with embodiments of the present invention.

FIG. 6 depicts a volume copy abort method in accordance with at least some embodiments of the present invention. The method is initiated when a request to abort a volume copy procedure is received at the controller 212 (step 604). This request may be received from a host 112 or administrative computer 116. Upon receiving this request, the controller 212 determines whether a volume copy is in progress for the specified partition (step 608). The controller 212 may make this determination by querying the volume copy module 340 to determine if it is currently creating a volume copy and by referencing the volume information block 324 to determine if a partition is having data copied thereto.

In the event that a volume copy procedure is not in progress for the specified partition, then the controller 212 returns an error message to the requesting device (e.g., the host 112 or administrative computer 116) indicating that a volume copy is not in progress (step 612). However, if a volume copy is in progress for the specified partition, then the controller 212 stops the volume copy process by interrupting the volume copy module 340 (step 616). After the volume copy process has been stopped, the attributes of the volume copy target 412 are restored to the snapshot 408, assuming the volume copy source was an actual snapshot 408 and not a temporary snapshot 408 (step 620). When the attributes of the snapshot 408 have been restored to the source snapshot 408, the method ends by deleting the volume copy target that was previously created (step 624).

Figure 7:
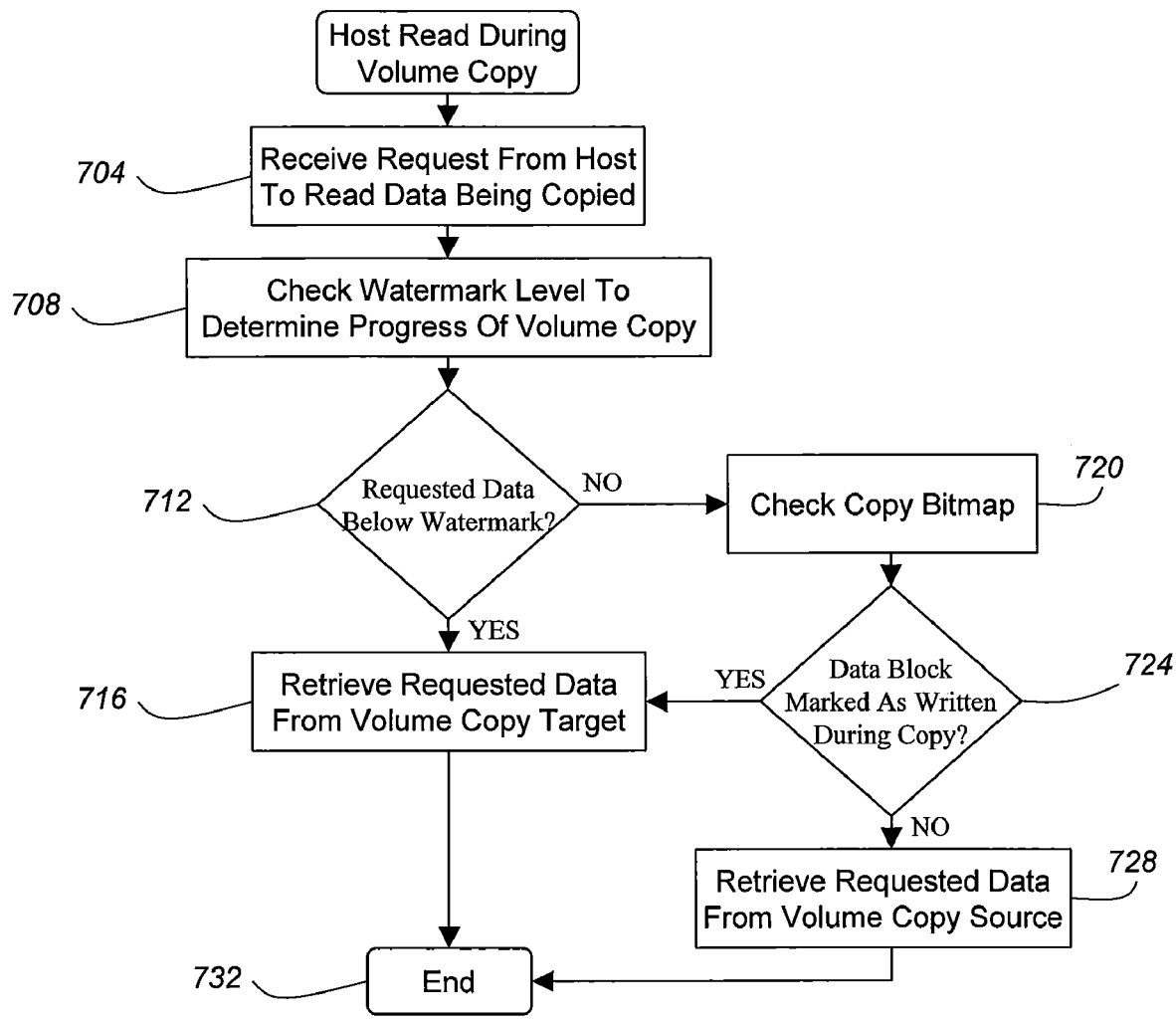
FIG. 7 is a flow diagram depicting a host read during volume copy method in accordance with embodiments of the present invention.

FIG. 7 depicts a method of executing a host 112 read command during a volume copy procedure in accordance with at least some embodiments of the present invention. The method begins when a request is received from the host 112 asking to read data from the volume copy target 412 (step 704). Upon receiving the request, the controller 212 references the watermark level to determine the progress of volume copy process (step 708). The watermark may be maintained in the backing store 232 partition metadata. Alternatively, the controller 212 may maintain an in-memory copy of the watermark for quick reference.

After checking the watermark level, the controller 212 determines whether the requested data is below the watermark level (step 712). By determining whether the requested is below the watermark level the controller 212 is able to determine whether the requested data has been transferred from the volume copy source to the volume copy target 412. Generally speaking, data that is below the watermark is data that has been copied from the volume copy source to the volume copy target 412. However, in accordance with certain embodiments of the present invention, the watermark indicator can be reversed, meaning that any data above the watermark is data that has been copied from the volume copy source to the volume copy target 412.

If the controller 212 determines that the data has been copied to the volume copy target 412 (i.e., the requested data is on a data block below the watermark), then the controller 212 utilizes the I/O application 332 to retrieve the requested data from the volume copy target 412 (step 716). However, if the controller 212 determines that the data is above the watermark (i.e., has not been copied during the volume copy process), then the controller 212 checks a copy bitmap (step 720). The copy bitmap is a data structure used to track whether a data block on the volume copy target 412 has been written to independent of the volume copy process. The copy bitmap may be maintained either on the backing store 232 or in memory 308.

After checking the copy bitmap, the controller 212 determines whether the data block containing the requested data has been written to independent of the volume copy (step 724). If the bitmap indicates that the data block has been written to, then the controller 212 utilizes the I/O application 332 to retrieve the requested data from the volume copy target 412 (step 716). However, if the bitmap indicates that the data block has not been written to, then the controller 212 utilizes the I/O application 332 to retrieve the requested data from the volume copy source (step 728). As described above, the volume copy source from which the data is retrieved may be either the snapshot 408 itself, another snapshot in the snappool, or the master volume 404. After the data has been retrieved, the method ends (step 732).

Figure 8:
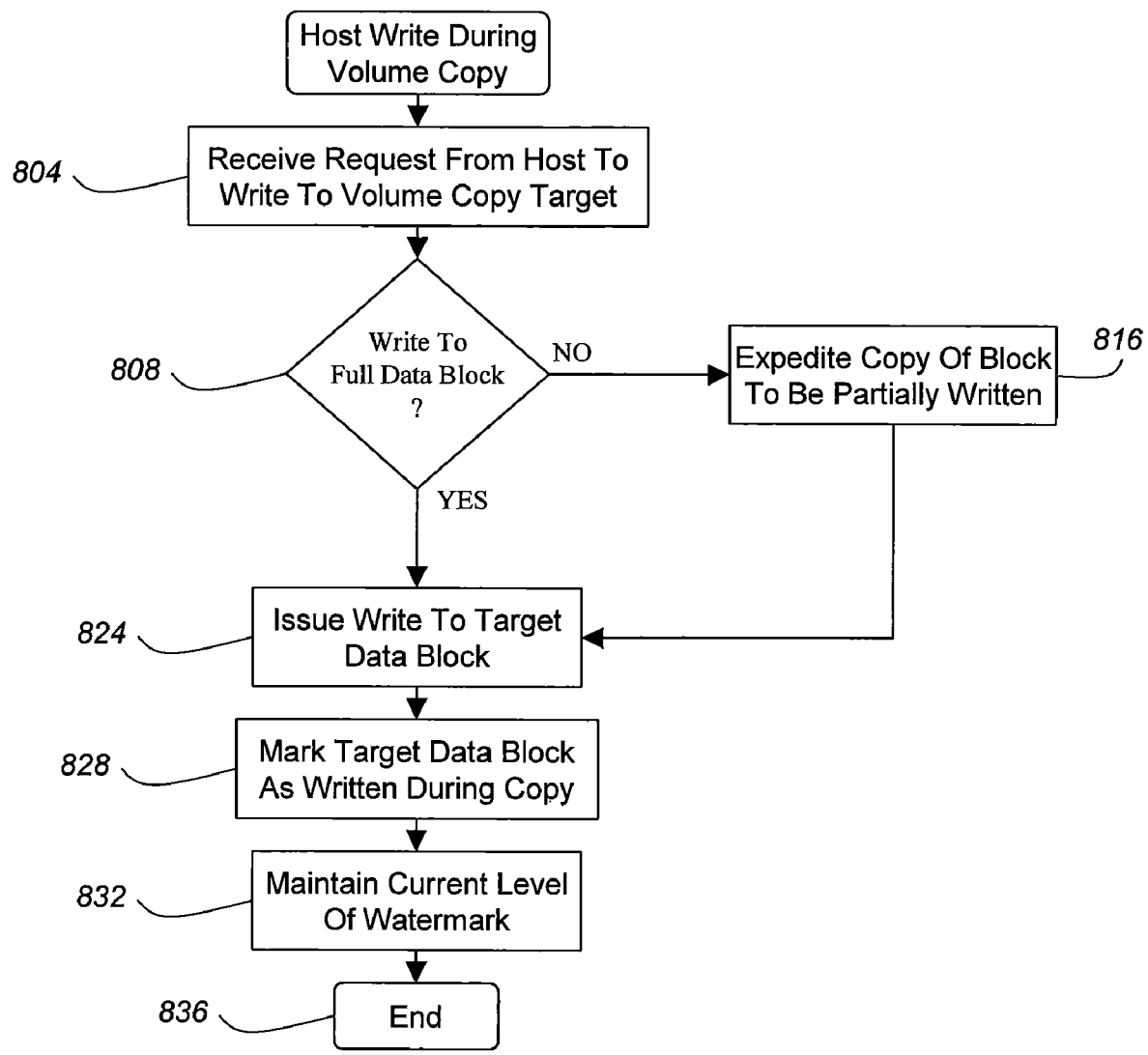
FIG. 8 is a flow diagram depicting a host write during volume copy method in accordance with embodiments of the present invention.

FIG. 8 depicts a method of executing a host write during a volume copy in accordance with at least some embodiments of the present invention. The method is initiated upon receiving a request from a host 112 to write data to the volume copy target 412 (step 804). Similar to a read command, the write command may be received from a host 112 or administrative computer 116.

Upon receiving the write request, the controller 212 determines whether the data will be written to a full block of data that has not already been written to during the volume copy process (step 808). In determining whether a full data block write will occur, the size of the data to be written is compared to the size of data blocks in the partition. Of course, if the volume copy process is using a granularity that differs from a full data block, such as a sub-chunk, then size of data to be written is compared to the smaller granularity (e.g., sub-chunk).

If the data write is a partial data write to a block that has not been copied to during the volume copy process, meaning that the data will be written to less than the entire data block or "portion" or whatever granularity is being used for the copy operation, then the controller 212 causes the volume copy module 340 to expedite the copying of the data block to which the data will be written (step 816). It should be noted that the copy of this particular data block does not require the volume copy process to be stopped. Moreover, the same interface within the controller 212 may be used to execute both copying of the data block and the volume copy process to move the data. These two functions can coexist on the same interface by utilizing a sparselock command that is implemented to prevent the other thread from accessing the same block range at the same time.

After the data block has been written to independent of the volume copy process or if the data write is a full data write (e.g., a data write to a memory address or addresses having a size greater than or equal to whatever granularity is being used for the copy operation) to a block that has not been copied during the volume copy process, then the controller 212 issues the write to the target data block (step 824). At this point, the data block on the volume copy target 412 contains that data that was supposed to be written to it and the volume copy process is continuing to increment through the data blocks of the snapshot 408 and volume copy target 412. Accordingly, the controller 212 can mark the target data block as written during the volume copy process (step 828). This indication may be maintained in the bitmap where it can be referenced during subsequent read operations. Although the controller 212 updates the bitmap it will maintain the current level of the watermark (step 832). This is because the data block is written to independent of the volume copy process. The volume copy module 340 maintains control of the position of the watermark based on its progress through the volume copy process. After the bitmap has been updated, the method ends (step 836).

The foregoing discussion of the invention has been presented for purposes of illustration and description. Furthermore, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best modes presently known of practicing the invention and to enable others skilled in the art to utilize the invention in such, or in other embodiments, and with the various modifications required by their particular application or use of the invention. It is intended that the appended claims be construed to include alternative embodiments to the extent permitted by the prior art.

What is claimed is:

1. A volume copy method, comprising:
receiving a command to create a volume copy of a volume copy source;
creating a volume copy target;
copying data from a snapshot associated with the volume copy source to the volume copy target; and
allowing host access to at least one of the volume copy source and volume copy target while the copying data step is occurring;
receiving a command to write data to the volume copy target during the copying step;
identifying a data block to which the data will be written;
writing the data to the data block; and
marking the data block as written during the copy.

2. The method of claim 1, wherein the volume copy source comprises a master volume and wherein the snapshot comprises a temporary snapshot of the master volume corresponding to a point-in-time when the command to create a volume copy was received.

3. The method of claim 1, wherein the snapshot is the volume copy source and wherein host access is further allowed to a master volume from which the snapshot originated.

4. The method of claim 3, further comprising:
   transferring attributes of the snapshot to the volume copy target; and
   creating new attributes for the snapshot.

5. The method of claim 4, wherein the attributes transferred from the snapshot to the volume copy target comprise at least one of a World Wide Name (WWN), a Logical Unit Number (LUN), and a serial number.

6. The method of claim 1, wherein the copying step is performed incrementally, the method further comprising:
   incrementing a watermark to reflect progress of the copying step.

7. The method of claim 6, further comprising:
   receiving a command to read data from the volume copy target during the copying step;
   referencing the watermark to determine the progress of the copying step;
   determining whether the data to be read is above or below the watermark;
   in the event that the data is below the watermark, reading the data from the volume copy target;
   in the event that the data is above the watermark, performing the following:
      (i) determining whether a data block that comprises the data has been written to independent of the copying step;
      (ii) in the event that the data block has been written to, reading the data from the volume copy target; and
      (iii) in the event that the data block has not been written to, reading the data from at least one of the master volume and a backing store.

8. The method of claim 1, further comprising:
   determining that the data will be written to only a portion of the data block;
   copying a corresponding data block from the snapshot to the data block of the volume copy target; and
   after copying the data block to the volume copy target, writing the data to the data block.

9. A device for controlling a storage system, comprising:
   a snapshot application comprising a volume copy module operable to copy data from a snapshot associated with a volume copy source to a volume copy target; and
   an Input/Output (I/O) application operable to execute read and write commands from at least one of the volume copy source and volume copy target while the volume copy module is copying data from the snapshot to the volume copy target, wherein the I/O application is further operable to receive a command to write data to the volume copy target while the volume copy module is copying the snapshot to the volume copy target, identify a data block to which the data will be written, write the data to the data block, and mark the data block as written during the copy.

10. The device of claim 9, wherein the volume copy source comprises a master volume and wherein the snapshot comprises a temporary snapshot of the master volume corresponding to a point-in-time when a command to create a volume copy was received.

11. The device of claim 9, wherein the snapshot is the volume copy source and wherein the I/O application is further operable to access a master volume from which the snapshot originated.

12. The device of claim 11, wherein the volume copy module is further operable to transfer at least one of a World Wide Name (WWN), a Logical Unit Number (LUN), and a serial number of the snapshot to the volume copy target.

13. The device of claim 9, further comprising a watermark, wherein the volume copy module is operable to update the watermark to reflect the progress of the data copy from the snapshot to the volume copy target.

14. The device of claim 13, wherein the I/O application is further operable to receive a command to read data from the volume copy target while the volume copy module is copying the snapshot to the volume copy target, reference the watermark to determine the progress of the data copy, determine that the data is above the watermark and a data block that comprises the data has not been written to by the volume copy module, and in response to making such a determination retrieve the requested data from the snapshot.

15. The device of claim 9, wherein the I/O application is further operable to determine that the data will be written to only a portion of the data block, copy a corresponding data block from the snapshot to the data block of the volume copy target and then write the data to the data block.

16. A data storage system, comprising:
   at least one data storage device that includes:
      a volume copy source;
      a snapshot associated with the volume copy source; and
      a volume copy target;
      a controller operable to execute at least one of a read and write command with respect to at least one of the volume copy source and volume copy target while copying data from the snapshot to the volume copy target
      a data structure, wherein the controller is further operable to receive a command to write data to the volume copy target, identify a data block to which the data will be written, write the data to the data block, and mark the data structure to reflect that the data block has been written during the copy.

17. The system of claim 16, further comprising a watermark, wherein the controller is operable to update the watermark to reflect the progress of the data copy from the snapshot to the volume copy target, and in response to receiving a command to read data from the volume copy target, reference the watermark to determine the progress of the data copy, determine that the data is above the watermark and a data block that comprises the data has not been written to by the volume copy module, and in response to making such a determination retrieve the requested data from the snapshot.

18. A volume copy method, comprising:
   receiving a command to create a volume copy of a volume copy source;
   wherein the volume copy source comprises a master volume;
   creating a volume copy target;
   copying data from a snapshot associated with the volume copy source to the volume copy target, wherein the copying step is performed incrementally, the method further comprising:
      incrementing a watermark to reflect progress of the copying step;
      allowing host access to at least one of the volume copy source and volume copy target while the copying data step is occurring;
   receiving a command to read data from the volume copy target during the copying step;
   referencing the watermark to determine the progress of the copying step;
   determining whether the data to be read is above or below the watermark;
   in the event that the data is below the watermark, reading the data from the volume copy target;

in the event that the data is above the watermark, performing the following:
  (i) determining whether a data block that comprises the data has been written to independent of the copying step;
  (ii) in the event that the data block has been written to, reading the data from the volume copy target; and
  (iii) in the event that the data block has not been written to, reading the data from at least one of the master volume and a backing store.

19. A device for controlling a storage system, comprising:
a snapshot application comprising a volume copy module operable to copy data from a snapshot associated with a volume copy source to a volume copy target;
an Input/Output (I/O) application operable to execute read and write commands from at least one of the volume copy source and volume copy target while the volume copy module is copying data from the snapshot to the volume copy target; and
a watermark, wherein the volume copy module is operable to update the watermark to reflect the progress of the data copy from the snapshot to the volume copy target, wherein the I/O application is further operable to receive a command to read data from the volume copy target while the volume copy module is copying the snapshot to the volume copy target, reference the watermark to determine the progress of the data copy, determine that the data is above the watermark and a data block that comprises the data has not been written to by the volume copy module, and in response to making such a determination retrieve the requested data from the snapshot.

* * * * *